C. P. TAYLOR.
MOTOR CONTROL SYSTEM.
APPLICATION FILED NOV. 21, 1913.
1,240,623.
Patented Sept. 18, 1917.
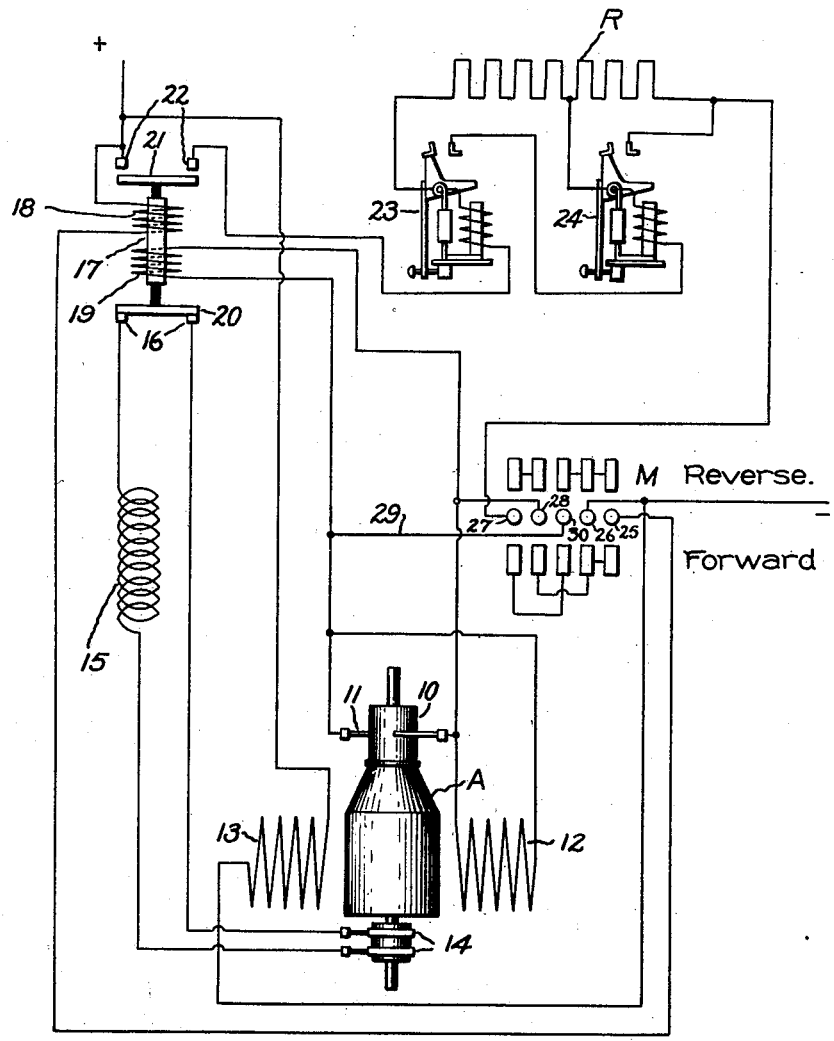
WITNESSES:
INVENTOR:
CARL P. TAYLOR,
BY
HIS ATTORNEY.

UNITED STATES PATENT OFFICE.

CARL P. TAYLOR, OF ROANOKE, VIRGINIA, ASSIGNOR TO GENERAL ELECTRIC COMPANY, A CORPORATION OF NEW YORK.

MOTOR-CONTROL SYSTEM.

1,240,623.  Specification of Letters Patent.  Patented Sept. 18, 1917.

Application filed November 21, 1913. Serial No. 802,223.

*To all whom it may concern:*

Be it known that I, CARL P. TAYLOR, a citizen of the United States, residing at Roanoke, county of Roanoke, State of Virginia, have invented certain new and useful Improvements in Motor-Control Systems, of which the following is a specification.

This invention relates to the control of electric motors and has for its object the provision of improved means whereby an electric motor may be started, stopped and generally controlled in a reliable and efficient manner.

In the operation of electric motors it is frequently desirable to rapidly retard the motor so as to bring it to rest quickly. This is commonly done by cutting off the supply of current and simultaneously closing a circuit across the motor armature through a resistance so that the motor acting as a generator will be retarded or "dynamically braked" by the generation of current. Heretofore this has been done by connecting the dynamic braking circuit through the commutator of the motor, the result often being that sparking is caused, especially when the dynamic braking current is high and the motor field relatively weak. One of the objects of my invention is to provide means whereby the motor will be dynamically braked without carrying the braking current through the commutator. This I accomplish by connecting a dynamic braking circuit to fixed points in the armature winding, preferably through collector rings, so that when this circuit is closed an alternating current will be generated by the motor acting as a generator and thus bring the armature to rest in a very effective manner, the arrangement being such that the dynamic braking circuit will be maintained closed and the circuit from the source of supply will be maintained open until the motor has been brought substantially to rest. A further object of my invention is to provide an arrangement whereby the motor will be periodically reversed and will be caused to operate at a different speed for each direction of rotation by means of two field windings which have a cumulative effect for the one direction of rotation and a differential effect for the opposite direction, one of the windings being connected across a source of supply and the other connected across the motor armature. Other objects and purposes of my invention will appear in the course of the following specification in which I have disclosed my invention embodied in concrete form for purposes of illustration.

Referring to the accompanying drawings in which I have illustrated my invention diagrammatically, A represents the armature of a direct current motor having a commutator 10 and brushes 11. This motor has two field windings 12 and 13 the former being connected across the armature brushes while the latter is connected across the supply circuit. The purpose of this arrangement will hereinafter appear. At the opposite end of the armature from the commutator I have provided two collector rings 14 connected with the armature in the customary way so as to deliver single phase alternating current. The circuit connected to these collector rings preferably includes an impedance 15 and switch contacts 16 which are closed to complete a dynamic braking circuit when it is desired to stop the motor. I have shown for purposes of illustration a reversing type of motor intended to operate machine tools, such as planers and the like, although it is obvious that my invention is not limited in its application to a reversible motor, nor is it limited to the generation of single phase current above mentioned, as distinguished from three phase or polyphase currents. The switch contacts 16 for closing the alternating current circuit are closed by an electro-magnetically operated switch 17 having an operating winding 18 connected across the supply circuit and a winding 19 for holding the dynamic braking circuit closed, this latter winding being connected in shunt with the motor armature. The switch 17 is double acting, as shown, being provided with two contact members 20 and 21, the former for bridging the contacts 16 while the latter bridges the contacts 22 to close the armature circuit. When the winding 18 is energized, the contact member 21 is moved upward so as to bridge the contacts 22 and when the winding 18 is deënergized, the switch member 17 drops by gravity so that the member 20 bridges the contacts 16 to close the dynamic braking circuit. The members are held in this lower position by the winding 19, which is connected across the armature, until the rotation of the armature practically ceases. The operation of the switch member 17 is thus responsive to the speed and the potential of the motor armature. A starting resistance R is provided for gradually bringing the motor up to speed, and two contactors 23 and 24 are provided for cutting out the resistance in two sections. These contactors I have shown as of the well known series type of contactor in which the actuating winding carries the motor current, the arrangement being such that the contactor is held open when the current is high and will not close until the current falls to a predetermined value. A master switch M is provided for controlling the direction of rotation of the motor and may be operated in any desired manner, either automatically, as in the case of a planer, or manually.

In the operation of certain reversing machines, especially in the case of such machine tools as planers and the like, it is customary to operate the machines at a greater speed during the return stroke, when no work is being done, than upon the forward or (in the case of a planer) the cutting stroke. This has commonly been done in the case of motor driven planers by varying the field resistance at the end of each stroke. In order to accomplish this result without changing the field resistance, I have provided the two permanently connected field windings 12 and 13. The winding 13 being connected directly across the line will produce a constant magnetizing effect, while the winding 12 being connected across the motor armature will have its effect reversed each time the motor armature is reversed. The winding 12, therefore, will upon one direction of rotation gradually build up to assist the winding 13 and strengthen the field, whereas, in the opposite direction of rotation, the winding 12 will gradually build up in opposition to the winding 13. When, therefore, the motor gets up to full speed in one direction there will be a field of maximum strength for the working stroke and when the armature is rotating in the opposite direction for the return stroke the field will be weakened. This of course will give a low speed and full field strength during the cutting stroke and high speed and a weakened field on the reverse stroke without any change whatsoever in field connections.

The arrangement of circuits and mode of operation of my device are as follows: With the master switch in the central position the parts are in the position shown in the drawing. If now the master switch is thrown to the position marked "forward" the winding 18 will be energized from the positive side of the line through the contacts 25 and 26 on the master controller to the negative side of the line. The energization of the magnet 18 causes the switch member 17 to be raised thereby causing the contacts 22 to be bridged by the contact member 21. The closing of the contacts 22 closes the armature circuit from the positive side of the line through the winding of contactor 23, starting resistance R, and contacts 27 and 30 of the master controller, through the motor armature by way of brushes 11, and thence through a conductor and contact 28 on the master switch to the negative side of the line. The field winding 13 being energized across the line, the motor will start and the starting resistance R gradually be cut out in a well understood manner. As the armature speeds up the field winding 12 will build up either to assist or oppose the winding 13, depending upon the direction of rotation of the armature. If the motor is operating in the forward direction, as when it is driving a planer on the cutting stroke, the two field windings 13 and 14 will assist each other and the motor will operate at its lowest speed. When the master switch M is thrown over to the opposite position the winding 18 will be deënergized for an instant and the switch member 17 will drop and bridge the contacts 16. The dropping of the contact 21 will open the supply circuit, while the bridging of the contacts 16 closes the dynamic braking circuit from the collector rings 14, through impedance 15, and contacts 16. The impedance 15 may be so proportioned that the dynamic braking current will be as high as the armature windings can carry, and for this reason the motor can thus be brought to rest very quickly. This, it will be seen, is quite different from what would be the case if the braking circuit were connected across the commutator, since in this latter case the amount of the braking current will be limited to an amount which will give substantially sparkless commutation. I have shown the impedance 15 in the form of a reactance, although either a resistance or reactance may be employed to accomplish the same result. When the master switch is thrown to the opposite direction, that is, so that the contacts are in "reversing" position, the winding 18 will be again energized and will tend to lift the switch member 17 and close the contacts 22. Switch member 17, however, will not be lifted to close the line circuit for the opposite direction until the armature has been brought substantially to rest, since the member 17 is held down by the winding 19 which is connected across the brushes of the motor; that is, the tendency of the winding 18 to lift the member 17 is restrained by the winding 19 until the armature potential has been practically reduced to zero and the motor has been brought substantially to rest. When, however, the armature has stopped rotating the winding 19 will be deenergized and the winding 18 will move the switch member upward to close the contacts 22 and open the contacts 16. This will close the armature circuit in the opposite direction of rotation, the circuit now being as follows: From the positive side of the line through the contacts 22, winding of switch 23, resistance R, through the contacts 27 and 28, on the master switch, through the motor armature in the opposite direction from that in which it went originally, thence through conductor 29, contact 30, contact 26 and back to the negative side of the line. The motor will now start and go up to full speed as before. This time, however, the field winding 12 opposes the field winding 13 so that as the motor speeds up the field weakens until finally the field magnetization is due to the difference in strength between the two field windings. The motor is therefore brought to a much higher speed than before. When the master controller operates the dynamic braking circuit again closes the contacts 16 so as to bring the armature to rest quickly and the circuit for the opposite direction of rotation cannot be closed until the armature has stopped rotating.

While I have described my invention as embodied in concrete form and as operating in a specific manner in accordance with the provision of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:—

1. In a control system for electric motors, a reversible direct current motor, means for causing the motor to operate at different speeds in the two directions, comprising two permanently connected shunt fields energized to have a cumulative effect for one direction of rotation and a differential effect for the opposite rotation, and means for reversing the motor.

2. In a control system for electric motors, a reversible direct current motor, means for causing the motor to operate at different speeds in the two directions comprising two field windings one of which is connected across the line and the other across the motor armature, and means for reversing the current through the latter field winding and the armature of said motor.

3. In a control system for electric motors, a reversible direct current motor, means for causing the motor to operate at different speeds in the two directions comprising two field windings one of which is connected across the line and the other across the motor armature, means for reversing the current in the latter field winding and the armature of said motor, a dynamic braking circuit supplied with alternating current from the motor armature, and means for maintaining the dynamic braking circuit until the motor has been brought substantially to rest before reversing the current in the said latter field winding and the motor armature.

4. In a control system for electric motors, a reversible direct current motor, means for dynamically braking the same comprising a circuit supplied with alternating current from the motor armature, an impedance in said circuit, a pilot switch for controlling the operation of said motor in both directions, means whereby the operation of said pilot switch causes the closure of the alternating current circuit to apply a dynamic brake to the motor and simultaneously causes the opening of the supply of current to the motor, and means for causing the motor to operate at different speeds in the two directions comprising field windings one of which is connected across the line and the other across the motor armature.

5. In a system of motor control, a direct current motor, a supply circuit therefor, a dynamic braking circuit supplied with alternating current from the motor armature, and means responsive to the speed of the motor operative after the supply circuit has been opened to maintain the dynamic braking circuit until the motor has been brought substantially to rest and then close the supply circuit.

6. In a system of motor control, a reversible direct current motor having two permanently connected shunt fields, a supply circuit therefor, a dynamic braking circuit supplied with alternating current from the motor armature, and means responsive to the speed of the motor operative after the supply circuit has been opened to maintain the dynamic braking circuit until the motor has been brought substantially to rest and then reverse the current to the motor armature and one of the field circuits.

7. In a system of motor control, a direct current motor, a supply circuit therefor, a dynamic braking circuit supplied with alternating current from the motor armature, a device for controlling said circuits having means tending to close the supply circuit and open the braking circuit, and means for restraining the tendency of the first-mentioned means until the motor has been brought substantially to rest.

8. In combination a direct current motor having an armature winding, said armature winding being provided with a commutator and slip rings, a supply circuit leading to said commutator, a braking circuit leading to said slip rings, means for controlling said circuits comprising an electromagnetic device having a winding tending to close the supply circuit and open the braking circuit and another winding restraining the tendency of the first winding until the motor has been brought substantially to rest.

9. In combination, a direct current motor having an armature winding, said armature winding being provided with a commutator and slip rings, a supply circuit leading to said commutator, a braking circuit leading to said slip rings, means for controlling said circuits comprising an electromagnetic device having a winding tending to close the supply circuit and open the braking circuit and another winding responsive to the potential across said commutator for restraining the tendency of the first winding until the motor has been brought substantially to rest.

10. In a system of motor control, a reversible direct current motor, a supply circuit therefor, a dynamic braking circuit supplied with alternating current from the motor armature, a reversing controller for the motor, and an electromagnetically controlled switching device operated responsively to the movement of the reversing controller to open the supply circuit and close the braking circuit, the said device having a winding responsive to the potential of the motor armature for maintaining the supply circuit open until the motor has been brought substantially to rest.

11. In a system of motor control, a reversible direct current motor, a supply circuit therefor, a reversing controller therefor, a dynamic braking circuit for the motor supplied with alternating current from the motor armature, and an electromagnetically controlled switching device operated responsively to the movement of the reversing controller for opening the supply circuit and closing the braking circuit for both directions of rotation of the motor armature, the said device having a winding energized from the motor armature for maintaining the supply circuit open until the motor has been brought substantially to rest.

In witness whereof, I have hereunto set my hand this 18th day of November, 1913.

CARL P. TAYLOR.

Witnesses:
LEONARD T. BLAISDELL,
WILLIAM H. WHITE, JR.